April 24, 1962 H. W. EARHART ET AL 3,031,513
PROCESS FOR OBTAINING DURENE
Filed Dec. 3, 1958
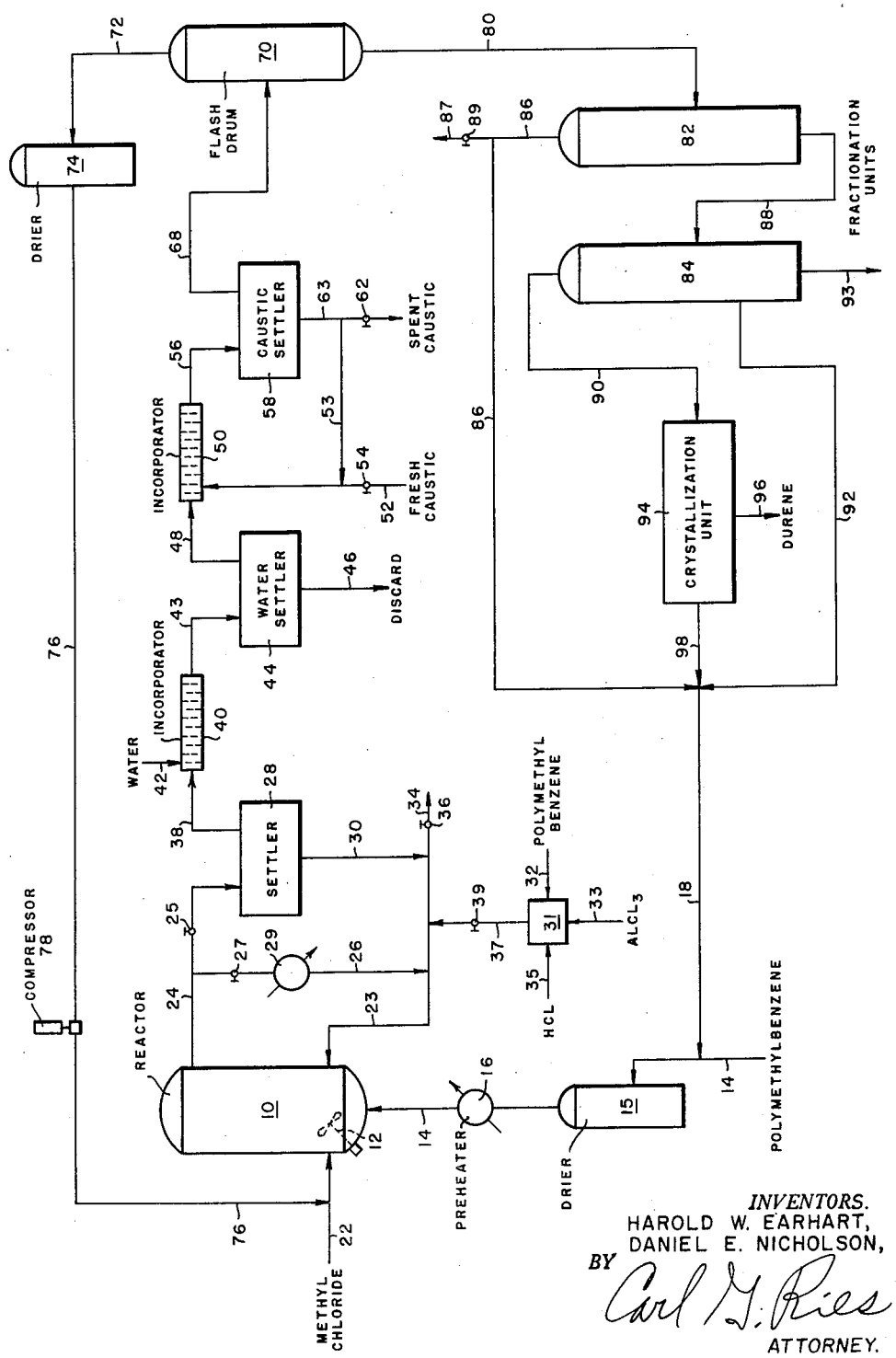
INVENTORS.
HAROLD W. EARHART,
DANIEL E. NICHOLSON,
BY
ATTORNEY.

3,031,513
PROCESS FOR OBTAINING DURENE
Harold W. Earhart and Daniel E. Nicholson, Baytown, Tex., assignors, by mesne assignments, to Esso Research and Engineering Company, Elizabeth, N.J., a corporation of Delaware
Filed Dec. 3, 1958, Ser. No. 777,931
6 Claims. (Cl. 260—668)

This invention relates to a process for the preparation of durene (1,2,4,5-tetramethylbenzene). More particularly, this invention relates to a continuous process for the production of durene by the combined methylation, isomerization, transmethylation, and disproportionation of a polymethylbenzene feed stock containing an average of from about 8.5 to about 9.5 carbon atoms per molecule in the presence of controlled amounts of aluminum chloride and methyl chloride.

This application is a continuation-in-part of Earhart and Nicholson application Serial No. 648,309, filed March 25, 1957, and entitled "Process for Obtaining Durene," now abandoned.

When a polymethylbenzene feed stock is treated with methyl chloride in the presence of aluminum chloride, a variety of reactions ensue, including methylation reactions, isomerization reactions, transmethylation reactions, and disproportionation reactions, which reactions are reversible and also competitive in nature. As a consequence, the reaction product that is obtained will normally be comprised of a wide variety of compounds including, for example, toluene, dimethylbenzenes (ortho-, meta- and paraxylenes), trimethylbenzenes (mesitylene, pseudocumene, hemimellitene), tetramethylbenzenes (durene, isodurene, prehnitene), pentamethylbenzene and hexamethylbenzene. In general, undesired aromatic hydrocarbons containing 13 and more carbon atoms per molecule are also formed.

Normally, there is no particular tendency toward the formation of a reaction product containing a preponderant amount of tetramethylbenzenes. Moreover, with respect to the tetramethylbenzenes that are prepared, the normal isomer distribution is such that isodurene is present as the most prevalent isomer.

Another serious problem is encountered with respect to the reaction products that are prepared in that degradation normally occurs during the treating reaction. Degradation, of course, is undesirable since it respresents conversion of feed to products other than durene and hence loss of valuable material is encountered when degradation occurs. More significantly, however, degradation products tend to deactivate the catalyst, thereby seriously affecting the economics of the process. Degradation is evidenced by the formation of a highly discolored product and the formation of high molecular weight semisolids.

From this it is apparent that serious problems exist with respect to the production of an enhanced amount of durene from polymethylbenzene feed stocks.

It has been discovered in accordance with the present invention that problems, such as the problems of degradation and of preferential isodurene formation may be overcome by treating a polymethylbenzene feed stock containing an average of about 8.5 to 9.5 carbon atoms per molecule in liquid phase with aluminum chloride in the presence of an amount of methyl chloride sufficient to provide a product containing an average of from about 9.5 to 10.5 carbon atoms per molecule under substantially atmospheric treating conditions including a temperature within the range of about 240° to about 310° F. and a contact time within the range of about 20 to 10 minutes. The amount of aluminum chloride to be present in the reactor should be in the range of about 0.4 to about 0.04 mol per mol of polymethylbenzene feed stock. Treating temperature, treating time and aluminum chloride content should be correlated.

The reaction should be conducted under substantially anhydrous conditions. A minor amount of hydrogen chloride must initially be present in the reaction mixture to initiate the reaction. Once the reaction has been initiated, hydrogen chloride for the process will be generated in situ. Thus, hydrogen chloride may be added together with the feed stock, aluminum chloride, and methyl chloride. More preferably, however, a minor amount of water (such as the trace amounts of water normally present in the feed stock) may be added initially whereby the water will react with the aluminum chloride to form the hydrogen chloride necessary for initiation of the reaction.

Under the described reaction conditions, there is obtained a substantially completely undegraded polymethylbenzene reaction product comprising an enhanced amount (e.g., about 40 to 60 weight percent) of tetramethylbenzenes, such tetramethylbenzenes fraction containing an enhanced amount (e.g., about 40 to 60 percent) of durene.

The fresh feed stock of the present invention should contain at least about 95 volume percent of polymethylbenzenes and should preferably be substantially completely free from non-aromatic hydrocarbon components. However, it is within the scope of the present invention to utilize feed stocks containing a predominant amount of polymethyl feed stocks in admixture with substantially non-olefinic feed stock impurities such as naphthenes, paraffins, benzene type compounds such as indans and alkyl benzenes substituted with alkyl groups other than methyl (e.g., ethyl benzene, ethyl toluenes, cymene, etc.). Such materials (hereinafter referred to as feed stock impurities) should preferably constitute less than about 5 volume percent of the feed stock.

The carbon atoms per molecule (average) in the fresh aromatic feed stock should be less than 10 and preferably is in the range of about 8.5 to 9.5. Thus, the feed stock may consist of polymethylbenzenes of less than 10 carbon atoms per molecule or may comprise a mixture of polymethylbenzenes of less than 10 carbon atoms per molecule with polymethylbenzenes with more than 10 carbon atoms per molecule, the mixture being proportioned so as to provide an average of less than about 10 carbon atoms per molecule. It is preferable to provide a feed stock containing a minimized amount of durene.

As indicated, the polymethylbenzene feed stock should be treated in liquid phase at about atmospheric pressure at a temperature within the range of about 240° to about 310° F. for an average reaction time of about 10 to 20 minutes. At about atmospheric pressure, substantial volatilization of the liquid reaction mixture will occur at temperatures above about 310° F.

Aluminum chloride concentration in the reactor should be within the range of about 0.04 to about 0.4 mol per mol of feed stock. When more than about 0.4 mol of aluminum chloride per mole of feed stock is employed, there is a substantial reduction in the amount of durene which is present in the reaction product. In addition, and as indicated, the amount of aluminum chloride to be employed should be correlated with reaction temperature and reaction time.

It will be understood of course, that aluminum chloride complexes with feed components and HCl to form a sludge-like material. A problem is encountered in conducting the process of the present invention when all of the aluminum chloride is added at the beginning of the run and when there is no further addition of aluminum chloride. In this situation there is a tendency for the activity of the catalyst to decline with the passage of time. However, in accordance with the present invention this problem is overcome by adding aluminum chloride during the reaction at a rate within the range of about 0.00015 to 1.0 (and preferably about 0.015) mol of aluminum chloride per mol of fresh feed stock. In a continuous process, this may be conveniently accomplished by admixing the make-up aluminum chloride with a segregated small portion of the feed stock in order to provide, for example, a make-up catalyst concentrate containing about 20 to 60 mol percent of aluminum chloride. During operations, the concentrate is added at a rate such that the desired rate of addition of make-up aluminum chloride is maintained. In this situation, a corresponding amount of aluminum chloride complex will be withdrawn from the reaction zone in order to prevent a build-up of aluminum chloride in the reaction zone. Further, in this situation there should also be added to the catalyst concentrate an equimolar amount of HCl. Thus, the concentrate will comprise aromatic feed and a complex containing about equimolar amounts of aluminum chloride, HCl and the aromatic component.

Methyl chloride should be present in an amount sufficient to provide a product having an average of about 9.5 to 10.5 carbon atoms per molecule. In determining the amount of methyl chloride to be added, the average carbon content per molecule of the feed stock may be determined and this value may be subtracted from a predetermined value of carbon atoms per molecule of product to give the number of mols of methyl chloride to be employed for the feed stock. For example, if the feed stock contains an average of 9 carbon atoms per molecule and it is desired to provide a product having about 10 carbon atoms per molecule, then about 1 mol of methyl chloride per mol of feed stock should be employed.

In accordance with a preferred form of the present invention, a suitable polymethylbenzene feed stock is treated with aluminum chloride and methyl chloride under the recited conditions to provide a polymethylbenzene product containing an enhanced amount of durene and such product is then fractionated to segregate a tetramethylbenzene fraction from the reaction product. Durene is next recovered from the tetramethylbenzene fraction by any suitable means such as by fractional crystallization and thereafter the remaining tetramethylbenzenes present in the filtrate, which are primarily isodurene and prehnitene, together with the other segregated products from the reaction mixture are recycled to the reaction zone. In this manner, substantially all of the polymethylbenzene feed stock components may be converted to durene.

It will be understood that in some instances it may be desired to recover products other than durene from the reaction mixture such as, for example, xylenes, mesitylene, pentamethylbenzene, etc. It is therefore within the scope of the present invention to recover such additional polymethylbenzenes from the reaction product by any suitable recovery methods such as fractional crystallization, distillation, etc.

The invention will be further considered in connection with the accompanying drawing wherein the sole figure is a schematic flow diagram illustrating a preferred method of practicing the process of the present invention at atmospheric pressure.

Turning now to the drawing there is shown a reactor 10 provided with a suitable agitating means such as a mixer 12. A suitable substantially wholly aromatic fresh fed stock consisting, for example, of about 95 weight percent of trimethylbenzenes is charged by way of a line 14 containing a drier 15 and a preheater 16 to the reactor 10. A polymethylbenzene recycle fraction obtained in a manner to be subsequently described is introduced by way of line 18 into the line 14 to provide a preferred mixed feed mixture which is charged to the reactor 10. The feed stock mixture is brought to reaction temperature in the preheater 16. A suitable amount of methyl chloride, for example, about 1 mol of methyl chloride per mol of feed stock, is charged to the reactor 10 by way of the line 22. From about 0.04 to about 0.4 mol of aluminum chloride per mol of aromatic feed stock is maintained in the reactor 10. The aluminum chloride may be initially charged in this amount by way of an aluminum chloride charge line 23. Thereafter, fresh aluminum chloride is added at a replacement rate in a manner to be described.

Within the reactor 10 the feed mixture undergoes simultaneous methylation, isomerization, transmethylation and disproportionation reactions to provide a polymethylbenzene product which is discharged from the reactor 10 by way of a discharge line 24 controlled by a valve 25. The product discharged by way of the line 24 will be comprised of a hydrocarbon phase and a complex phase. Since the reactions occurring in the reactor 10 are generally of an exothermic nature, it is desirable to provide suitable means for maintaining a desired reaction temperature within the reactor 10. This may be accomplished, for example, by providing a recycle line 26 controlled by a valve 27 and containing a cooler 29, the recycle line 26 interconnecting the discharge line 24 with the charge line 23. With this arrangement, a portion of the product stream withdrawn from the reactor 10 by way of the line 24 is passed through the cooler 29 by way of the recycle line 26. It will be understood that the amount of material recycled through the line 26 will be correlated with the cooling capacity of the cooler 29.

The remainder of the material discharged from the line 24 is passed through the valve 25 to a settler 28 wherein the aluminum chloride-containing complex formed in the reaction zone 10 is separated from the hydrocarbon components of the reaction product. The complex is discharged from the settler 28 by way of a line 30 leading to the charge line 23. With this arrangement, maximum utilization of the aluminum chloride can be obtained by recycle of the complex.

As has been mentioned, during continuous operations make-up aluminum chloride is substantially continually added in order to maintain the activity of the catalyst. This may be accomplished, for example, through the provision of a concentrate preparation vessel 31. A small amount of a suitable polymethylbenzene (e.g., a $C_9$ polymethylbenzene such as pseudocumene) is added to the vessel 31 by way of a line 32. Aluminum chloride is added by way of a line 33 and HCl is added by way of a line 35. The three components are added in an amount such that there is formed within the vessel 31 a complex which contains equimolar amounts of HCl, aluminum chloride and the polymethylbenzene, such complex being in admixture with the polymethylbenzene in an amount sufficient to provide a concentrate containing about 20 to 60 mol percent of aluminum chloride.

The concentrate is discharged from the vessel 31, as needed, by way of a line 37 controlled by a valve 39 leading to line 23. As indicated, the concentrate is added at a rate such that from about 0.00015 to 1.0 mol of aluminum chloride is added by way of the line 37 per mol of fresh polymethylbenzene feed stock added by way of the line 14. In order to prevent aluminum chloride build-up within the reactor 10, an equivalent amount of complex is discarded by purge from the line 30 by way of a purge line 34 controlled by a valve 36.

The clarified product is discharged from the settler 28 by way of a line 38 leading to a suitable water washing device such as an incorporator 40 wherein the product is intimately contacted with water introduced thereinto by way of a line 42. The mixture of wash water and product is discharged from the incorporator 40 by way of a line 43 leading to a suitable separation zone 44 wherein the phase separation occurs. The aqueous phase is discarded from the settler 44 by way of line 46 and a substantially hydrogen chloride free oil product is discharged by way of line 48.

The line 48 leads to a caustic washing device of any suitable construction such as a baffle plate incorporator 50, wherein the water washed product is treated with a suitable alkaline treating agent such as caustic introduced by way of a line 52 containing a valve 54, this step being provided to neutralize the product and remove trace amounts of acidic product components. The alkaline treated product is discharged from the incorporator 50 by way of a line 56 leading to a settler 58 wherein the alkaline solution is separated from the product by phase separation. The alkaline solution is withdrawn from the settler 58 by way of a line 63 and thence by way of branch line 53 for recycle. If desired, a portion of the spent alkaline solution may be discharged from the system by opening valve 62 in line 63.

The thus-treated product is discharged from the settler 58 by way of a line 68 leading to a flash drum 70 wherein residual amounts of unreacted methyl chloride are separated from the product. The thus-segregated methyl chloride is removed overhead from the flash drum 70 by way of a line 72 leading to a suitable drier 74. From the drier 74 the methyl chloride is passed by way of a line 76 containing a compressor 78 leading to the methyl chloride charge line 22.

The remainder of the product consisting essentially of polymethylbenzenes is discharged from the bottom of the flash drum 70 by way of a line 80 leading to a suitable fractionation zone comprising, for example, distillation columns 82 and 84.

In the distillation zone a tetramethylbenzene fraction is separated from the product.

This is preferably accomplished by introducing the polymethylbenzene product 80 into a first fractionating column 82 wherein $C_9$ and lighter methylbenzenes are separated by fractional distillation and taken overhead by way of a line 86 leading to the recycle charge line 18.

When the fresh polymethylbenzene feed stock added by the line 14 contains light impurities, it will be desirable to prevent a build-up of light impurities in the system by removing a portion of the light fraction 86 from the system. This may be accomplished through the provision of a purge line 87 controlled by a valve 89 whereby a selected portion of the overheads fraction 86 may be removed through the line 87 through suitable manipulation of the valve 89.

The bottoms fraction 88 containing $C_{10}$ and heavier polymethylbenzenes is charged to a second distillation column 84 wherein an overheads fraction 90 is obtained which consists essentially of tetramethylbenzenes. There is also obtained from the column 84 a bottoms side stream 92 containing principally penta- and hexamethylbenzene, together with closely boiling materials.

A bottoms fracton 93 is discharged from tower 84 and discarded from the system. The bottoms fraction 93 is provided to remove such trace amounts of degradation products containing 13 or more carbon atoms as may be formed during the course of the reaction. In addition, heavy impurities which are present in the system due to the introduction of impurities through the line 14 may also be purged with the bottoms fraction 93.

The tetramethylbenzene fraction 90 is charged to a suitable durene recovery zone 94 such as a fractional crystallization recovery zone, wherein a product consisting essentially of durene is separated from the tetramethylbenzene fraction.

By way of example, a fractional crystallization recovery step may be employed as disclosed in copending Bozich et al. application Serial No. 555,405, filed December 27, 1955, now U.S. Patent No. 2,913,503, and entitled "Recovery of Crystallizable Hydrocarbons." The durene product is discharged from the fractional crystallization zone 94 by way of a line 96 and a tetramethylbenzene filtrate fraction is discharged by way of a line 98 leading to the recycle charge line 18.

As an example of an operation conducted in the manner shown in the drawing, there may be provided about 100 mols per day of a pseudocumene charge stock having the following composition:

FEED STOCK COMPOSITION

| | |
|---|---|
| m-Ethyltoluene | 0.039 |
| p-Ethyltoluene | 0.040 |
| Mesitylene | 0.740 |
| o-Ethyltoluene | 1.127 |
| Pseudocumene | 95.570 |
| m-Cymene | 0.738 |
| Hemimellitene | 0.198 |
| Indan | 0.020 |
| Non-aromatics | 1.528 |

It will be observed that in this situation the pseudocumene feed stock will contain minor amounts of other polymethylbenzenes and, in addition, will contain minor amounts of aromatic and non-aromatics. Thus, the impurities in this situation include ethyl toluenes, xylene, indan, and non-aromatics. The fresh pseudocumene feed stock and a recycle fraction 18 may be admixed and charged by way of the line 14 to the reactor 10; the charge will contain about 25 mol percent of fresh feed and have an average of less than about 10 carbon atoms per molecule. Methyl chloride is an amount sufficient to provide a product containing an average of about 10 carbon atoms per molecule is added by charge line 22. The amount of aluminum chloride maintained within the reactor 10 may be sufficient to provide a polymethylbenzene liquid phase-to-complex-containing phase volume ratio of about 0.5. (The complex-containing phase may comprise about 50% polymethylbenzene and about 50% of a complex containing about 65% aluminum chloride.) Suitable operating conditions may include an average residence time for the polymethylbenzene of about 15 minutes and a reaction temperature of about 250° F.

Fresh make-up aluminum chloride is also added to the reactor 10 at a suitable rate such as at the rate of about 0.015 mol of fresh aluminum chloride per mol of fresh polymethylbenzene feed stock. An equivalent amount of aluminum chloride is discharged through the line 34 in order to maintain a substantially constant aluminum chloride concentration in the reactor 10.

Under these conditions, the hydrocarbon product that is obtained after the settling step 28 and the wash steps 40 and 50 will comprise about 100 mols per day of polymethylbenzene material which may be charged by way of the line 80 to the first distillation column 82. The charge material may be split in the column 82 to provide about 60 mols per day of a bottoms fraction 88 and about 40 mols per day of an overheads fraction 86, of which about 4 mols per day is purged through the line 87 in order that light impurities may be purged from the system.

Within the second distillation column 84, the fraction 88 is separated into about 42.5 mols per day of a tetramethylbenzene concentrate, about 17.2 mols per day of a bottoms side stream recycle fraction 92, and about 0.3 mol per day of a bottoms discharge fraction 93 which contains heavy impurities.

The tetramethylbenzene concentrate charged to the crystallization zone 94 by way of the line 90 may be separated into about 22.5 mols per day of a recycle fraction 98 containing not more than about 10 volume percent of durene and about 20 mols per day of a product fraction 96 consisting of durene having a purity of about 95 volume percent.

The present invention will be further considered in conjunction with the following examples which are given by way of illustration and not intended as limitations on the scope of this invention.

EXAMPLE I

As has been indicated, a temperature of at least about 240° F. should be employed in order to obtain a maximized yield of tetramethylbenzenes. This is shown by the results that are obtained when treating a feed stock having a composition as set forth in Table I.

Table I

INSPECTIONS ON FEED STOCK

Component analysis, wt. percent:

| | |
|---|---|
| 1,3,5 trimethylbenzene | 1.2 |
| 1,2,4 trimethylbenzene | 83.8 |
| 1,2,3 trimethylbenzene | 9.4 |
| Orthoethyltoluene | 1.8 |
| Isobutylbenzene | 0.4 |
| m-Cymene | 0.7 |
| Indan | 2.7 |
| | 100.0 |

The feed stock of Table I was treated with methyl chloride in the presence of aluminum chloride at atmospheric pressure under standardized treating conditions in a plurality of runs wherein the only major change in conditions was a change in temperature.

Thus, the standardized conditions included an aluminum chloride concentration at the start of each run of about 0.14 mol of aluminum chloride per mol of feed stock which was introduced at the beginning of each of the runs in question. There was no further addition of aluminum chloride.

The other generally standardized reaction conditions are set forth in Table I–A, together with the results that were obtained with respect to methyl chloride conversion.

Table I–A

| | | | | | |
|---|---|---|---|---|---|
| ASU Run No | (23) | (21) | (20) | (18) | (19) |
| Run No | 1 | 2 | 3 | 4 | 5 |
| Run Length, Hrs | 19 | 13 | 6 | 9 | 8 |
| Operating conditions: | | | | | |
| Average Temp., °F | 198 | 219 | 227 | 249 | 301 |
| Oil Charge Rate, Lb./Hr | 2.99 | 2.92 | 3.79 | 2.27 | 2.73 |
| CH₃Cl Charge Rate, Lb./Hr | 1.29 | 1.33 | 1.29 | 1.28 | 1.41 |
| Mols CH₃Cl/Mol Oil | 1.03 | 1.08 | 0.81 | 1.34 | 1.23 |
| CH₃Cl Conversion (by HCl Recovery): | | | | | |
| During First Hour | 44.0 | 47.0 | 56.1 | 95.8 | 94.5 |
| During Fifth Hour | 4.6 | 16.2 | 4.3 | 80.8 | 50.3 |
| During Ninth Hour | 4.8 | 6.9 | | | |
| During Last Hour | 2.1 | 6.9 | 2.5 | 9.2 | 23.0 |

From Table I–A, it will be observed that in runs 1, 2, and 3 which were conducted at a temperature of less than 250° F., there was an unsatisfactory rate of reaction as evidenced by the fact that only about one-half of the charged methyl chloride was consumed during the first hour of the run. Moreover, the activity dropped off quite markedly after the first hour. Thus, in run No. 3, conducted at an average temperature of 227° F. during the first hour of reaction, only about 66 percent of the methyl chloride was reacted.

In contrast, about 96 percent of the methyl chloride was consumed during the first hour of reaction in run No. 4, conducted in accordance with the present invention. Still further, the methyl chloride consumption was still quite high even after 5 hours of reaction (about 81 percent), as contrasted with a methyl chloride consumption of only 0.3 percent obtained in the case of run No. 3. The results in run No. 5, which was conducted in accordance with the present invention, show that good activity was obtained at a temperature of about 300° F.

The foregoing experimental results demonstrate, therefore, that in order to obtain a satisfactory reaction rate it is necessary to employ a temperature of at least about 240° F.

EXAMPLE II

It has been indicated that, with respect to the tetramethylbenzene fraction that is formed in accordance with the present invention, there is obtained a maximized yield of durene by using less than about 0.3 mol of aluminum chloride per mol of feed stock.

This is shown by the following series of runs wherein pseudocumene was treated at a temperature of 300° F. in the liquid phase with varying amounts of aluminum chloride. The reaction conditions employed and the product distribution with respect to tetramethylbenzenes are set forth in Table II.

Table II

EFFECT OF ALUMINUM CHLORIDE CONCENTRATION AND TREATING TIME ON DURENE PRODUCTION WHEN TREATING PSEUDOCUMENE WITH ALUMINUM CHLORIDE

| Temperature, °F | 300 | | | | | |
|---|---|---|---|---|---|---|
| Time, Min | 15 | 15 | 10 | 120 | 10 | 120 |
| Aluminum Chloride (Mols/Mol Pseudocumene) | 0.10 | 0.30 | 0.50 | 0.50 | 1.0 | 1.0 |
| C₁₀ Polymethylbenzene Isomer Distribution, Percent: | | | | | | |
| Durene | 41.1 | 40.2 | 33.8 | (*) | 21.0 | (*) |
| Isodurene | 45.4 | 44.7 | 50.5 | (*) | 69.0 | (*) |
| Prehnitene | 13.5 | 15.1 | 15.7 | (*) | 10.0 | (*) |
| Total | 100.0 | 100.0 | 100.0 | | 100.0 | |

*Product severely degraded; no analysis possible.

From Table II it will be observed that a tetramethylbenzene fraction containing at least about 40 percent of durene was obtained when employing about 0.1 and about 0.3 mol of aluminum chloride but that a substantial reduction in the amount of durene obtainable and a substantial appreciation in isodurene content was experienced when using 0.5 and 1.0 mol of aluminum chloride per mol of pseudocumene.

It is further to be observed that when treating pseudocumene with 0.5 and 1.0 mol of aluminum chloride per mol of pseudocumene for a reaction time of 120 minutes there was obtained a severely degraded product; about 50 percent of the feed was converted to tarry residues.

EXAMPLE III

The use of excessive amounts of methyl chloride should be avoided if a maximized yield of tetramethylbenzenes is to be obtained. This is shown by the results obtained when treating pseudocumene with about 0.16 mol of aluminum chloride per mol of pseudocumene and varying amounts of methyl chloride. Reaction conditions employed and the results obtained are set forth in Table III.

Table III

EFFECT OF METHYL CHLORIDE CONCENTRATION ON TETRAMETHYLBENZENE PRODUCTION WHEN TREATING PSEUDOCUMENE WITH ALUMINUM CHLORIDE AND METHYL CHLORIDE

| | | |
|---|---|---|
| Reaction Temperature, °F | 275 | 300 |
| Reaction Time, Min | 20 | 20 |
| Aluminum Chloride (Mols/Mol Pseudocumene) | 0.16 | 0.16 |
| Methyl Chloride (Mols/Mol Pseudocumene) | 1.0 | 1.2 |
| Polymethylbenzene Product Distribution, Wt. Percent: | | |
| Xylenes | 1.0 | |
| Trimethylbenzenes | 16.0 | 4.9 |
| Tetramethylbenzenes | 58.0 | 50.8 |
| Pentamethylbenzenes | 21.3 | 40.0 |
| Hexamethylbenzenes | 3.0 | 3.6 |
| C₁₃ Aromatic Hydrocarbons | 0.7 | 0.7 |
| Total | 100.0 | 100.0 |

From Table III it will be observed that when employing about 1 mol of methyl chloride per mol of pseudocumene at a temperature of 275° F. there is obtained a product containing about 58 weight percent of tetramethylbenzenes. However, a product containing only about 50 percent tetramethylbenzenes was obtained when employing 1.2 mols of methyl chloride per mol of pseudocumene even though a higher temperature of 300° F. was employed.

EXAMPLE IV

As has been indicated, the feed stock for the process of the present invention may comprise a mixture of polymethylbenzenes containing an average of less than about 10 carbon atoms per molecule. This is shown by the results that were obtained by treating a feed stock having the composition set forth in Table IV with about 0.25 mol of aluminum chloride per mol of feed stock and about 0.3 mol of methyl chloride per mol of feed stock in liquid phase at a temperature of about 300° F. for a contact time of about 10 minutes. The composition of the product is also set forth in Table IV.

Table IV

| | Feed[1] | Product |
|---|---|---|
| Component, Wt. percent: | | |
| Toluene | 0.0 | |
| Paraxylene | 0.5 | |
| Metaxylene | 0.9 | |
| Orthoxylene | 0.6 | |
| 1,3,5-Trimethylbenzene | 5.0 | 5.5 |
| 1,2,4-Trimethylbenzene | 29.9 | 8.5 |
| 1,2,3-Trimethylbenzene | 6.8 | 1.0 |
| Total Trimethylbenzenes | 41.7 | 15.0 |
| Durene | 3.5 | 23.6 |
| Isodurene | 27.3 | 27.8 |
| Prehnitene | 8.3 | 5.6 |
| Total Tetramethylbenzenes | 39.1 | 57.0 |
| Pentamethylbenzene | 15.7 | 17.3 |
| Hexamethylbenzene | 1.4 | 0.8 |

[1] The feed contained an average of about 9.7 carbon atoms per molecule

From Table IV it will be observed that the toluene and xylene components of the feed stock were converted to higher molecular weight polymethylbenzenes, that there was no significant change with respect to penta- and hexamethylbenzene and no significant change with respect to isodurene and prehnitene content. It will be observed also that the trimethylbenzene content of the final product was substantially less than the trimethylbenzene content, while the durene content of the product was substantially greater than the durene content of the feed. Thus, the net result of the reaction was a conversion of $C_8$ and $C_9$ methylbenzenes to tetramethylbenzenes, durene being one of the major $C_{10}$ isomers present in the final product.

This application contains subject matter in common with copending Edward and Boynton application Serial No. 777,930, filed December 3, 1958, now U.S. Patent No. 2,976,335, and entitled "Method of Maintaining Catalyst Activity."

Having thus described our invention, what is claimed is:

1. A process which consists of reacting a feed stock consisting of polymethylbenzene having an average of less than about 10 carbon atoms per molecule in liquid phase with methyl chloride in the presence of from about 0.4 to about 0.04 mol of aluminum chloride per mol of feed stock at a temperature within the range of about 240° to about 310° F. for a time within the range of about 20 to 10 minutes and thereafter recovering durene from the products of said reaction, the amount of methyl chloride being sufficient to provide a product containing an average of about 9.5 to 10.5 carbon atoms per molecule.

2. A continuous process for the preparation of durene which consists of continually charging to a reaction zone a feed stock consisting of a mixture of a main recycle fraction with a fresh feed stock fraction consisting of trimethylbenzenes, maintaining in said reaction zone from about 0.04 to about 0.4 mol of aluminum chloride per mol of total feed stock, further continually charging to said reaction zone about 1 mol of methyl chloride per mol of trimethylbenzene fresh feed stock, continually maintaining within said reaction zone atmospheric pressure conversion conditions including a reaction temperature within the range of about 240° to about 310° and a reaction time of about 20 to 10 minutes, continually withdrawing a product stream from said reaction zone, fractionating said product stream into a light recycle fraction composed primarily of components containing less than about 10 carbon atoms per molecule, a heavy recycle fraction composed principally of components containing more than about 10 carbon atoms per molecule and a fraction containing an average of about 10 carbon atoms per molecule, separating high purity durene from said fraction containing an average of about 10 carbon atoms per molecule, and mixing the remainder of said fraction containing about 10 carbon atoms per molecule with said light and heavy recycle fraction to provide said main recycle fraction.

3. A continuous process as in claim 2 wherein the fresh feed stock fraction consists of pseudocumene.

4. A continuous process for the preparation of durene which consists of continually charging to a reaction zone a feed stock consisting of a mixture of a main recycle fraction with a fresh feed stock fraction consisting of trimethylbenzenes, establishing in said reaction zone a complex containing from about 0.04 to about 0.4 mol of aluminum chloride per mol of total feed stock, maintaining said amount of aluminum chloride in said reaction zone by continually charging thereto fresh aluminum chloride at the rate of from about 0.00015 to 1.0 mol per mol of said fresh feed stock and continually withdrawing an equimolar amount of aluminum chloride from said reaction zone, further continually charging to said reaction zone about 1 mol of methyl chloride per mol of trimethylbenzene fresh feed stock, continually maintaining within said reaction zone atmospheric pressure conversion conditions including a reaction temperature within the range of about 240° to about 310° and a reaction time of about 20 to 10 minutes, continually withdrawing a product stream from said reaction zone, fractionating said product stream into a light recycle fraction composed primarily of components containing less than about 10 carbon atoms per molecule, a heavy recycle fraction composed principally of components containing more than about 10 carbon atoms per molecule and a fraction containing an average of about 10 carbon atoms per molecule, separating high purity durene from said fraction containing an average of about 10 carbon atoms per molecule, and mixing the remainder of said fraction containing about 10 carbon atoms per molecule with said light and heavy recycle fraction to provide said main recycle fraction.

5. A continuous process as in claim 4 wherein about 0.015 mol of said fresh aluminum chloride is continually added per mol of said trimethylbenzene fresh feed stock.

6. A process as in claim 4 wherein the feed stock is pseudocumene.

References Cited in the file of this patent

UNITED STATES PATENTS

| 2,369,495 | Schmerling et al. | Feb. 13, 1945 |
| 2,447,599 | Schmerling | Aug. 24, 1948 |
| 2,756,261 | Fetterly | June 22, 1954 |
| 2,896,001 | Boynton et al. | July 21, 1959 |

OTHER REFERENCES

Thomas: "Anhydrous Aluminum Chloride in Organic Chemistry," Reinhold Publishing Corporation, 1941, pp. 86–88 relied on.